UNITED STATES PATENT OFFICE.

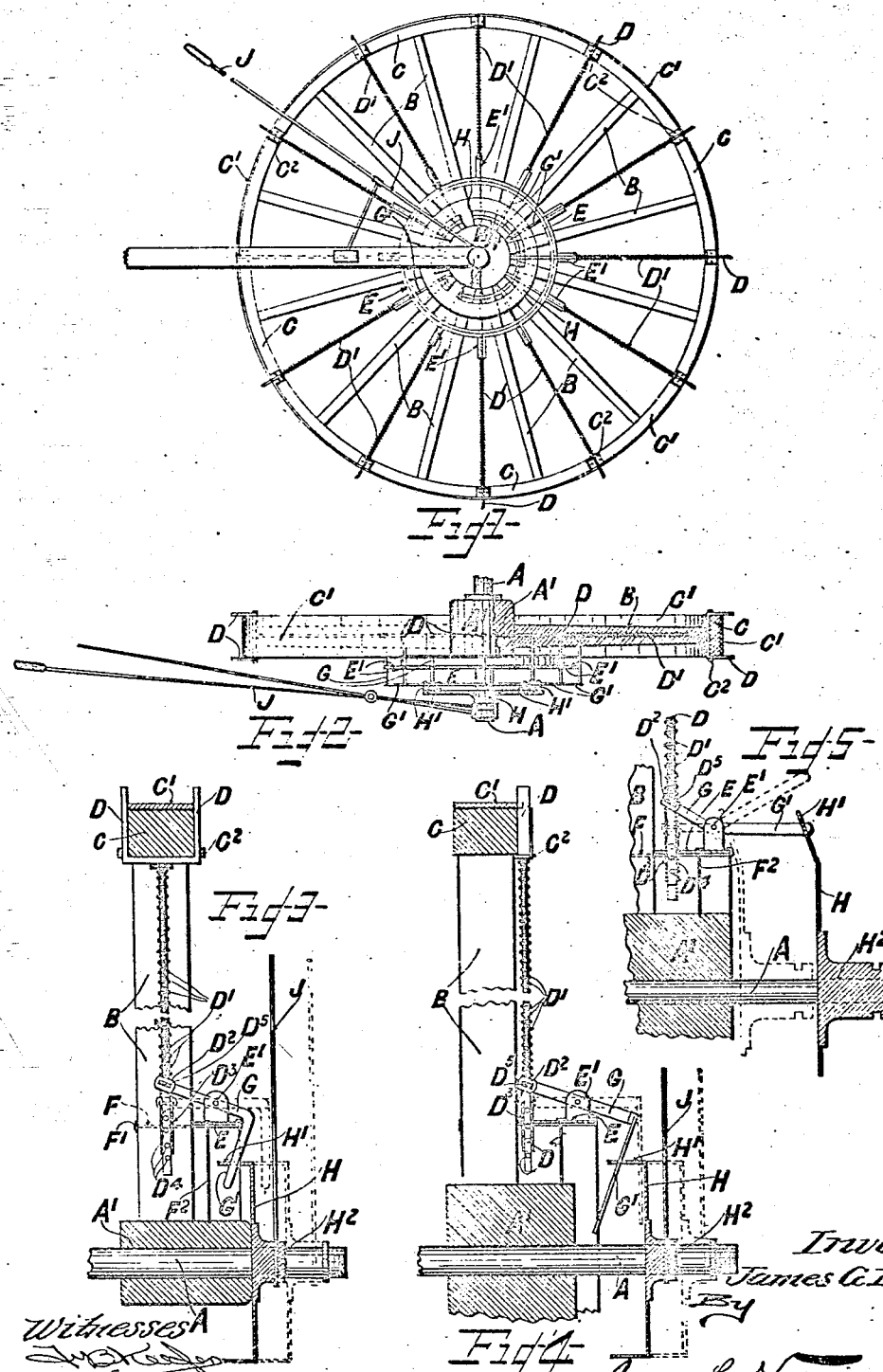

JAMES GARIE DISHER, OF TOTHILLS CREEK, SOUTH AUSTRALIA, AUSTRALIA.

WHEEL.

No. 895,348.　　　Specification of Letters Patent.　　　Patented Aug. 4, 1908.

Application filed July 16, 1907. Serial No. 384,070.

*To all whom it may concern:*

Be it known that I, JAMES GARIE DISHER, a subject of the King of Great Britain, residing at Tothills Creek, in the State of South Australia, in the Commonwealth of Australia, machinist, have invented certain new and useful Improvements in Wheels, of which the following is a specification, reference being had therein to the accompanying drawings.

My invention relates to certain improvements in wheels and refers more particularly to the driving wheels of agricultural implements velocipedes and other road vehicles.

With agricultural implements at present in use the driving wheels have a tendency to slip back and retard the operation of the machine, and with velocipedes and other road vehicles the objectionable slipping when turning corners or from other causes is well known.

The object of my invention is to provide a wheel by which this slipping may be obviated. I accomplish this object by providing a wheel (whose tire and hub are connected by spokes in the usual way) with movable spring gripping bars whose outer ends are adapted to project outwards at intervals around the circumference of the tire so as to engage the ground and whose inner ends are supported from a ring surrounding the hub. The gripping bars are operated by a handle actuating a wheel which moves laterally upon the axle and which operates a series of pivoted levers supporting the said gripping bars in such a manner that the outer ends of the said bars may be projected outwards from the tire or drawn inwards to its level as desired.

In order that my invention may be the better understood, I will now proceed to describe the same with reference to the accompanying drawings in which:—

Figure 1 is a side view of a wheel embodying my improvements. Fig. 2 is a plan of the same partly in section. Fig. 3 is a detail end view showing the arrangement and operation of one of the gripping bars. Figs. 4 and 5 are end views showing modifications of the same.

In these drawings A represents the wheel axle carrying the hub A' and in which are mounted the spokes B connecting the rim C and tire C' in the ordinary way. These may be modified in construction and arrangement to suit the varying classes of wheels.

D represents the gripping bars which are arranged between the spokes B and provided with heads adapted to project outwards at intervals around the circumference of the tire C', and work in suitable guides $C^2$ attached to the rim C. The gripping bars D may be constructed of round iron and may be forked at their outer ends as shown in Fig. 3 to provide a grip at either side of the tire C'. As a modification they may be arranged at one side only of the tire C' as shown in Fig. 4. The outer ends of the bars D are preferably squared and beveled as shown for the purpose of gripping the ground.

Each gripping bar D is provided with a spiral spring D' held in place between the guide $C^2$ and a ball $D^2$ supported upon the bar D by a sleeve $D^3$ held in place upon the gripping bar D by a screw nut or by a movable pin adapted to engage the holes $D^4$ whereby the sleeve $D^3$ may be adjusted to alter and regulate the pressure of the spring D'. If removed outward from the hub A' the spring D' is compressed and exerts an increased pressure upon the gripping bar D; if it is desired to decrease the pressure it is only necessary to move the sleeve $D^3$ inwards.

For the purpose of supporting the gripping bars D a metal ring E is arranged to surround the hub A'. A narrow ring E is sufficient when the bars D are arranged between the spokes B as shown in Fig. 3 but when the bars D are arranged at the side of the spokes B a wider ring E, as shown in Figs. 4 and 5, is required. The ring E is supported by means of clamp bolts F bearing against the sides of the spokes B as shown in Figs. 3 and 4 of the drawings. The inner ends of the bolts F are bent to engage the edge of the ring E while the outer ends are clamped together by nuts and plates F'. Suitable stays $F^2$ secured to the ring E and bearing upon the hub A' are also provided for rigidly maintaining the ring E in position. The ring E is provided at intervals with sockets E' in which are pivoted supporting levers G. The sockets E' are arranged to correspond with the number of gripping bars D. Each lever G is bifurcated at one end and provided with openings adapted to engage projections $D^5$ upon the ball $D^2$ on each of the gripping bars D. The other end G' of each lever G is bent either downwards (as shown in Figs. 3 and 4) or upwards (as shown in Fig. 5) and is adapted to pass through a loop H' upon a wheel H arranged to move laterally upon the axle A (as shown in dotted lines Figs. 3 and 4 and 5). To the hub H² of the wheel H is attached a lever J which may be connected to a lever adapted to be operated by the driver of the implement or vehicle.

In operation the gripping bars D when applied to driving wheels of agricultural implements may be arranged to project outside the circumference of the tire C' and thereby prevent the wheel from slipping or dragging. The bars D on coming into contact with a stone or other obstruction immediately yield inwards until the obstruction is passed, by means of the sprial springs D'. If the implement is traveling over hard ground and the assistance of the gripping bars D is not required they may be all simultaneously moved inwards to the level of the tire or tread, by the single operation of the hand lever.

When applied to velocipedes or road vehicles the gripping bars D are adapted to prevent slipping when turning corners or the like. In ordinary traveling they are arranged so that their outer ends do not project outside the tire C' but when required the bars D may be instantly projected outside the tire C' by manipulating the lever.

What I claim, and desire to secure by Letters Patent of the United States, is:—

1. An anti-slipping device for wheels comprising the combination with the rim, spokes and hub of the wheel, of shiftable gripping members, means for slidably connecting the outer ends of said members to the rim, a coiled spring mounted upon each of said members, adjustable abutments carried by said members and engaging the lower ends of the springs whereby the tension of said springs can be regulated, means carried by the members for retaining the abutments in their adjusted positions, a supporting ring connected with said spokes and members and surrounding the hub, bell-crank levers pivoted upon said ring and having one arm engaging said abutments, said levers when shifted in one direction moving said members outwardly and when shifted in the other direction moving said members inwardly, and means engaging with the other arm of each of said levers for actuating them.

2. An anti-slipping device for wheels comprising the combination with the rim, spokes and hub of the wheel, of shiftable gripping members having forked heads straddling the wheel rim, means for slidably connecting the heads to the rim, a spring mounted upon each of the members, shiftable abutments carried by said members for regulating the tension of said springs, adjustable means carried by said members for retaining the abutments in their shifted position, a series of bell-crank levers each having one arm forked and operatively connected to an abutment, a pivot for each of said levers, supporting means for said pivots, and means engaging with the other arm of each of said levers for shifting them, causing thereby the moving of the heads to or from operative position.

In testimony whereof I affix my signature in presence of witnesses.

JAMES GARIE DISHER.

Witnesses:
CHAS. A. MURPHY,
CHARLES STANLEY BURGESS,
ARTHUR WHITRIDGE BOWEN.